(12) United States Patent
Sakazaki et al.

(10) Patent No.: US 10,240,636 B2
(45) Date of Patent: Mar. 26, 2019

(54) ROLLING BEARING DEVICE AND OIL SUPPLY UNIT

(71) Applicant: JTEKT CORPORATION, Osaka-shi, Osaka (JP)

(72) Inventors: Tsukasa Sakazaki, Kizugawa (JP); Yoshimichi Higashiyama, Kashihara (JP); Masami Naka, Yamatokoriyama (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/928,626

(22) Filed: Mar. 22, 2018

(65) Prior Publication Data

US 2018/0283454 A1     Oct. 4, 2018

(30) Foreign Application Priority Data

Mar. 31, 2017  (JP) ................................ 2017-071622

(51) Int. Cl.
*F16C 33/66*   (2006.01)
*F16C 19/06*   (2006.01)

(52) U.S. Cl.
CPC .......... *F16C 33/6659* (2013.01); *F16C 19/06* (2013.01)

(58) Field of Classification Search
CPC .................................................. F16C 33/6659
See application file for complete search history.

(56) References Cited

U.S. PATENT DOCUMENTS

| 2017/0016481 | A1  | 1/2017  | Stoimenov et al. |
| 2017/0276177 | A1* | 9/2017  | Nozaki ................... F16C 19/06 |
| 2017/0288120 | A1* | 10/2017 | Higashiyama ...... F16C 33/6659 |
| 2017/0328410 | A1* | 11/2017 | Tanimoto ............ F16C 33/6659 |
| 2018/0017052 | A1* | 1/2018  | Naka ....................... F04B 51/00 |
| 2018/0149200 | A1* | 5/2018  | Higashiyama .......... F16C 19/16 |

FOREIGN PATENT DOCUMENTS

JP       2017-020611 A       1/2017

* cited by examiner

*Primary Examiner* — Thomas R Hannon
(74) *Attorney, Agent, or Firm* — Oliff PLC

(57) ABSTRACT

A rolling bearing device includes: a bearing portion that has an inner ring, an outer ring, a plurality of balls, and a cage that holds the plurality of balls; and an oil supply unit provided adjacent to the bearing portion in the axial direction and configured to supply lubricating oil to the bearing portion. The oil supply unit has: a pump that suctions lubricating oil into an oil chamber and discharges the lubricating oil by varying a capacity of the oil chamber by periodically driving a piezo element; and a control portion that causes the pump to operate by varying a rising time of a voltage applied to the piezo element in accordance with whether a drive period of the piezo element is long or short.

5 Claims, 5 Drawing Sheets

ROLLING BEARING DEVICE AND OIL SUPPLY UNIT

INCORPORATION BY REFERENCE

The disclosure of Japanese Patent Application No. 2017-071622 filed on Mar. 31, 2017 including the specification, drawings and abstract, is incorporated herein by reference in its entirety.

BACKGROUND OF THE INVENTION

1. Field of the Invention

The present invention relates to a rolling bearing device and an oil supply unit.

2. Description of the Related Art

In recent years, various types of machine tools are requested to increase the speed of a main spindle in order to improve the processing efficiency and the productivity. When the main spindle is rotated at a high speed, the lubricating property of a bearing portion that supports the main spindle is particularly important. Thus, there is proposed a rolling bearing device in which an oil supply unit is provided adjacent to a bearing portion in the axial direction (see Japanese Patent Application Publication No. 2017-20611 (JP 2017-20611 A)). The oil supply unit has a tank that stores lubricating oil, a pump that discharges the lubricating oil in the tank to the bearing portion, etc.

The oil supply unit described above is installed, together with the bearing portion, in a narrow annular space between the main spindle and a housing on the outer side thereof, for example. Therefore, with the oil supply unit, it is preferable to reduce the frequency of replenishing the tank with lubricating oil as much as possible in order to improve maintenance and management. To this end, it is necessary to suppress wasteful discharge (consumption) of lubricating oil by the pump, and the pump preferably discharges only a minute amount of lubricating oil.

In order to discharge only a minute amount of lubricating oil, there is proposed a pump (piezo pump) that discharges lubricating oil through drive of a piezo element. This pump suctions lubricating oil into an oil chamber and discharges the lubricating oil by varying the capacity of the oil chamber by periodically driving the piezo element. With this pump, if the drive period of the piezo element is shortened in the case where the viscosity of the lubricating oil is high, the timing to vary the capacity of the oil chamber is advanced. Since the lubricating oil is suctioned into the oil chamber and discharged slowly because of the high viscosity, however, the lubricating oil may not be suctioned and discharged quickly enough for the variations in capacity of the oil chamber. Then, the frequency of discharge of the lubricating oil without sufficient lubricating oil suctioned into the oil chamber is increased, which makes operation to discharge the lubricating oil unstable.

SUMMARY OF THE INVENTION

An object of the present invention is to stabilize operation of a pump to discharge lubricating oil even if the drive period of a piezo element is shortened.

An aspect of the present invention provides a rolling bearing device including: a bearing portion that has an inner ring, an outer ring, a plurality of rolling elements interposed between the inner ring and the outer ring, and a cage that holds the plurality of rolling elements; and an oil supply unit provided adjacent to the bearing portion in an axial direction and configured to supply lubricating oil to the bearing portion, in which the oil supply unit has: a pump that suctions lubricating oil into an oil chamber and discharges the lubricating oil by varying a capacity of the oil chamber by periodically driving a piezo element; and a control portion that causes the pump to operate by changing a rising time of a voltage applied to the piezo element in accordance with whether a drive period of the piezo element is long or short.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
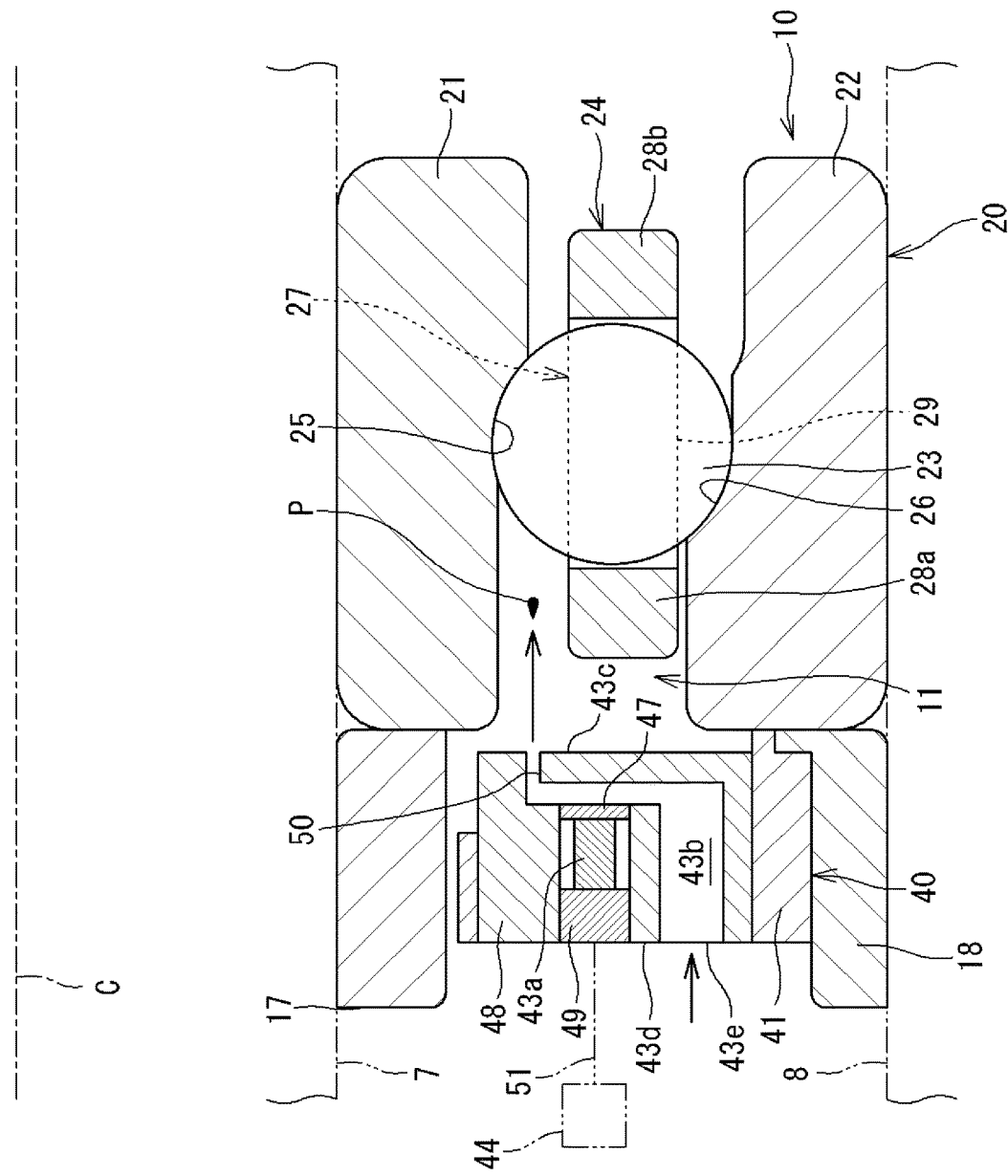
FIG. 1 is a sectional view illustrating a rolling bearing device according to an embodiment.

FIG. 1 is a vertical sectional view illustrating a rolling bearing device 10 according to an embodiment of the present invention. A bearing device 10 according to the present embodiment (hereinafter also referred to as a "bearing device 10") rotatably supports a main spindle (shaft 7) of a main spindle device (rotary device) of a machine tool, and is housed in a bearing housing 8 of the main spindle device. In FIG. 1, the shaft 7 and the bearing housing 8 are indicated by the long dashed double-short dashed lines. In the following description, the direction which is parallel to a center line C of the bearing device 10 is referred to as an "axial direction", and the direction which is orthogonal to the axial direction is referred to as a "radial direction".

The bearing device 10 includes a bearing portion 20 and an oil supply unit 40. The bearing portion 20 has an inner ring 21, an outer ring 22, a plurality of balls (rolling elements) 23, and a cage 24 that holds the balls 23, and constitutes a ball bearing (rolling bearing). The bearing device 10 further includes an inner ring spacer 17 and an outer ring spacer 18 in a cylindrical shape.

The oil supply unit 40 has a circular ring shape as a whole, is attached to the radially inner side of the outer ring spacer 18, and is positioned adjacent to the bearing portion 20 in the axial direction. The oil supply unit 40 has a function of supplying lubricating oil to the bearing portion 20. The configuration and the function of the oil supply unit 40 will be described in detail later. In the present embodiment, the oil supply unit 40 (body portion 41) and the outer ring spacer 18 are separate from each other. However, the oil supply unit 40 and the outer ring spacer 18 may be integral with each other. In this case, the oil supply unit 40 also has a function as an outer ring spacer, in addition to the function of supplying oil.

In the present embodiment, the outer ring 22, the outer ring spacer 18, and the oil supply unit 40 are attached so as not to be rotatable with respect to the bearing housing 8, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member that is externally fitted with the shaft 7. A raceway (hereinafter referred to as an "inner ring raceway 25") is formed on the outer periphery of the inner ring 21. In the present embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the present embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and rolled on the inner ring raceway 25 and the outer ring raceway 26. The cage 24 has an annular shape as a whole, and is formed with a plurality of pockets 27 along the circumferential direction. The balls 23 and the cage 24 are provided in an annular space 11 formed between the inner ring 21 and the outer ring 22.

The cage 24 has an annular portion 28a on one side, in the axial direction, of the balls 23, an annular portion 28b on the other side, in the axial direction, of the balls 23, and a plurality of cage bars 29 that couple the annular portions 28a and 28b to each other. Spaces between the annular portions 28a and 28b and between the cage bars 29 and 29 which are adjacent to each other in the circumferential direction serve as the pockets 27. One ball 23 is housed in each of the pockets 27. With this configuration, the cage 24 can hold the plurality of balls 23 at intervals in the circumferential direction.

The cage 24 is made of a resin (for example, a phenol resin). The inner ring 21 and the outer ring 22 are made of steel such as bearing steel. The balls 23 may be made of steel such as bearing steel, or may be made of a ceramics.

Figure 2:
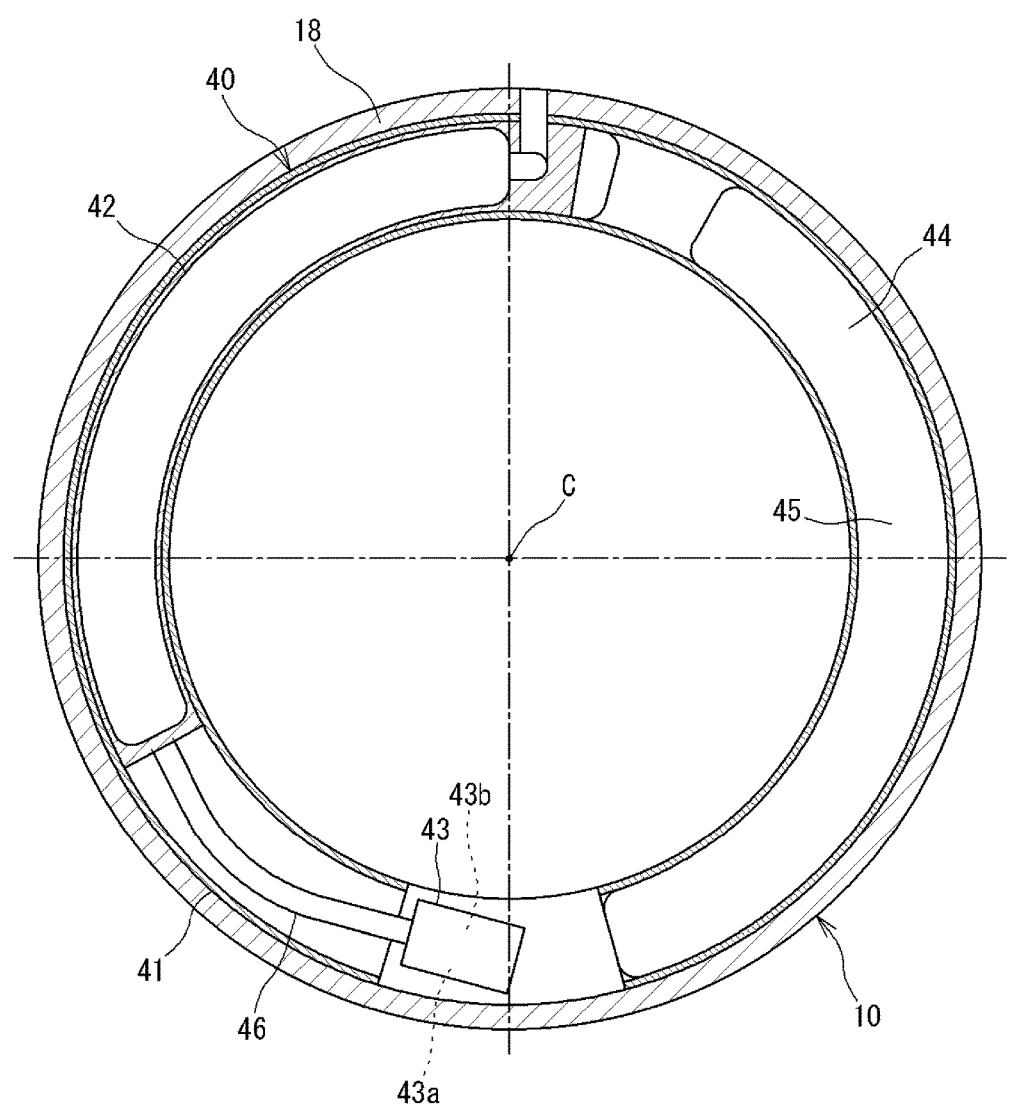
FIG. 2 is a cross-sectional view of an oil supply unit as seen in the axial direction.

FIG. 2 is a cross-sectional view of the oil supply unit 40 as seen in the axial direction. The oil supply unit 40 has a circular ring shape as a whole. The oil supply unit 40 includes a tank 42 and a pump 43. The tank 42 and the pump 43 are provided in an annular body portion 41 of the oil supply unit 40. The oil supply unit 40 further includes a control portion 44 and a power source portion 45.

The body portion 41 is attached to the inner peripheral side of the outer ring spacer 18, and has a function as a frame that holds the pump 43 etc. The body portion 41 is a circular ring member, and is formed with hollow spaces. The pump 43, the control portion 44, and the power source portion 45 are provided in the hollow spaces. One of the hollow spaces serves as the tank 42. Consequently, the oil supply unit 40 which includes the body portion 41, the tank 42, the pump 43, the control portion 44, the power source portion 45, etc. is constituted integrally. The tank 42 stores lubricating oil (oil), and is connected to the pump 43 through piping 46 in order to cause the lubricating oil to flow to the pump 43.

In FIG. 1, the pump 43 has a function of supplying lubricating oil to the bearing portion 20. In order to demonstrate this function, the pump 43 has a pump body 48 provided with a nozzle (ejection port) 50 that discharges lubricating oil. The pump body 48 has an oil chamber (internal space) 43b, which is a space that is connected to the nozzle 50 and that stores lubricating oil, and a piezo element (piezoelectric element) 43a. The nozzle 50 according to the present embodiment is constituted of a hole with one end opening in one side surface 43c of the pump body 48 which faces the annular space 11 and with the other end communicating with the oil chamber 43b. A suction port 43e that communicates with the oil chamber 43b is formed in the other side surface 43d of the pump body 48 on the opposite side of the one side surface 43c. The piping 46 (see FIG. 2) which extends from the tank 42 is connected to the suction port 43e.

An elastically deformable diaphragm 47 that constitutes a part of a wall of the oil chamber 43b is provided in the pump body 48. One end portion, in the axial direction, of the piezo element 43a is attached to the diaphragm 47. An electrode 49 is provided in the pump body 48. The other end portion, in the axial direction, of the piezo element 43a is attached to the electrode 49. The electrode 49 is connected to the control portion 44 via a wire 51. The control portion 44 has a function of controlling the timing to cause the pump 43 to operate.

When a voltage is periodically applied from the control portion 44 to the piezo element 43a via the wire 51 and the electrode 49, the piezo element 43a deforms the diaphragm 47. Consequently, the capacity of the oil chamber 43b is varied. When the capacity of the oil chamber 43b is varied in this manner, lubricating oil is suctioned into the oil chamber 43b. This allows lubricating oil in the oil chamber 43b to be discharged from the nozzle 50 to the annular space 11 of the bearing portion 20. In particular, when the piezo element 43a operates, lubricating oil is discharged from the nozzle 50 as oil droplets P at an initial velocity. That is, the oil droplets P fly from the nozzle 50.

The nozzle 50 opens toward the inner ring raceway 25. The oil droplets P which are discharged from the nozzle 50 hit the balls 23, or hit the inner ring raceway 25 even if they pass through a space between the balls 23 and 23 which are adjacent to each other. Power for operation of the pump 43 is supplied from the power source portion 45 (see FIG. 2).

From the above, the pump 43 is a piezo pump that discharges lubricating oil by periodically driving the piezo element 43a, and receives lubricating oil from the tank 42 in the oil chamber 43b. In addition, the pump 43 is configured to eject lubricating oil in the oil chamber 43b (cause lubricating oil in the oil chamber 43b to fly) from the nozzle 50 toward a target of the bearing portion 20 as the oil droplets P. From the viewpoint of efficient use of lubricating oil, the pump 43 ejects a determined amount of the oil droplets P in one discharge operation to cause the oil droplets P to reach the target of the bearing portion 20. Several picoliters to several nanoliters of lubricating oil are ejected from the nozzle 50 as the oil droplets P in one operation of the pump 43. In the present embodiment, the target is the balls 23 and the inner ring raceway 25.

Figure 3:
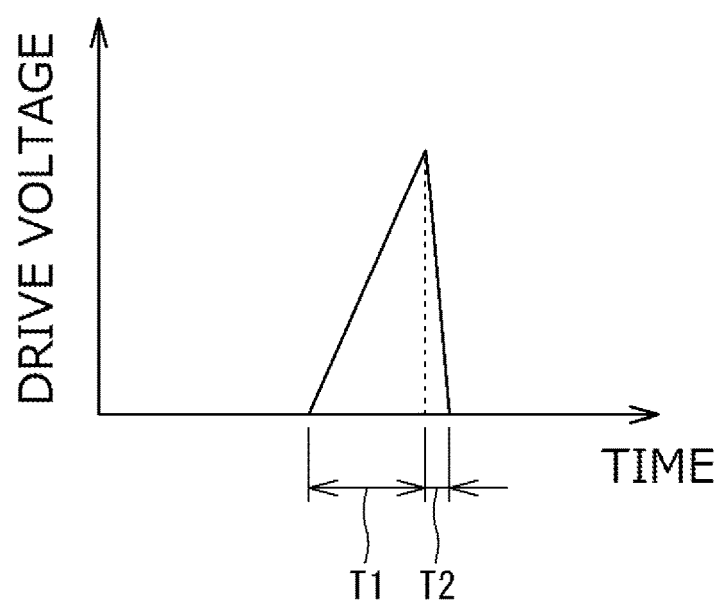
FIG. 3 is a graph indicating an example of the waveform of a drive voltage applied to a piezo element.

FIG. 3 indicates an example of the waveform (temporal variations in voltage) of a voltage (drive voltage) applied to the piezo element 43a. In FIGS. 1 and 3, when a drive voltage is applied to the piezo element 43a, the piezo element 43a deforms the diaphragm 47 so as to increase the capacity of the oil chamber 43b during a rising time T1 of the voltage waveform. Consequently, lubricating oil is suctioned into the oil chamber 43b. The diaphragm 47 is deformed such that the piezo element 43a decreases the capacity of the oil chamber 43b during a falling time T2 of the voltage waveform. Consequently, lubricating oil in the oil chamber 43b is discharged from the nozzle 50.

Figure 5A:
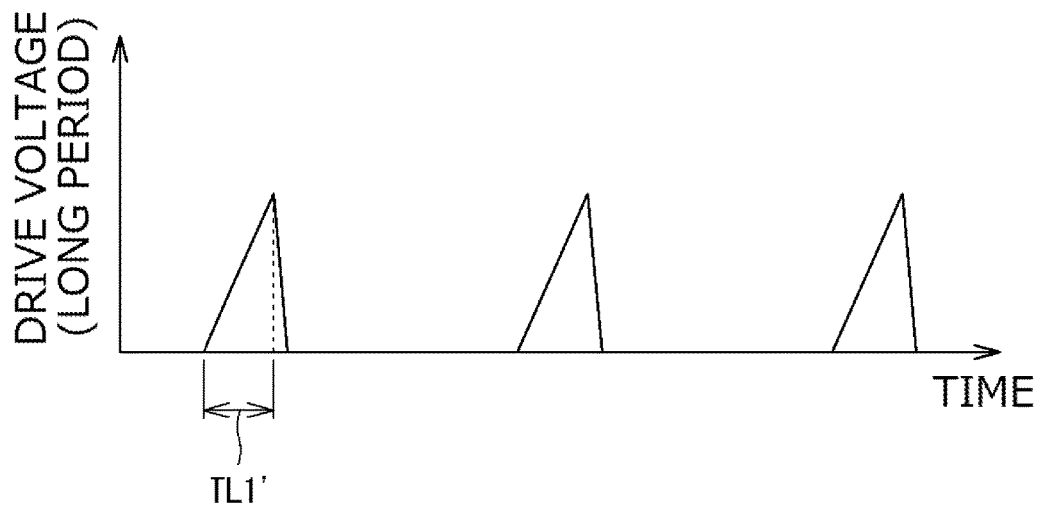
FIG. 5A indicates the voltage waveform of a drive voltage periodically applied to a piezo element according to the related art at long periods.
Figure 5B:
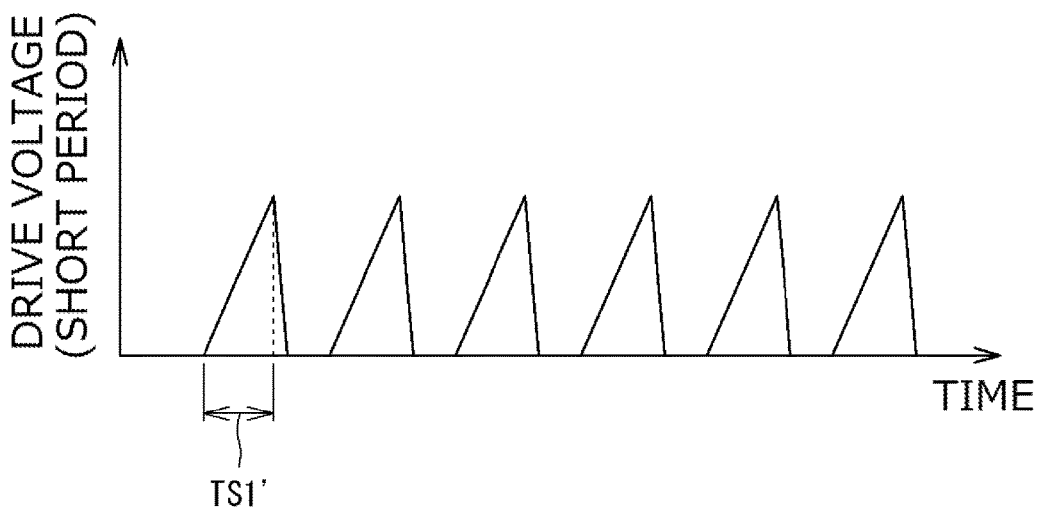
FIG. 5B indicates the voltage waveform of a drive voltage periodically applied to a piezo element according to the related art at short periods.

Voltage waveforms of a drive voltage periodically applied to the piezo element 43a according to the related art will be described with reference to FIG. 5. FIG. 5A indicates the voltage waveform of a drive voltage applied at long periods. FIG. 5B indicates the voltage waveform of a drive voltage applied at short periods. In the related art, as illustrated in FIGS. 5A and 5B, a rising time TL1' in the voltage waveform of a drive voltage applied to the piezo element 43a at long intervals and a rising time TS1' in the voltage waveform of a drive voltage applied to the piezo element 43a at short intervals are set to the same time.

That is, in the related art, the rising times TL1' and TS1' of the drive voltage which is applied to the piezo element 43a are constant irrespective of whether the drive period of the piezo element 43a is long or short. Therefore, if the piezo element 43a is driven at short periods in the case where the viscosity of the lubricating oil is high, the timing to vary the capacity of the oil chamber 43b is advanced. Since the lubricating oil is suctioned into the oil chamber 43b and discharged slowly because of the high viscosity, however, the lubricating oil may not be suctioned and discharged quickly enough for the variations in capacity of the oil chamber. Then, the frequency of discharge of the lubricating oil without sufficient lubricating oil suctioned into the oil chamber 43b is increased, which makes operation to discharge the lubricating oil unstable.

Thus, in the present embodiment, the control portion 44 performs control for changing the rising time T1 of the drive voltage which is applied to the piezo element 43a in accordance with whether the drive period of the piezo element 43a is long or short. This control will be described specifically below.

Figure 4A:
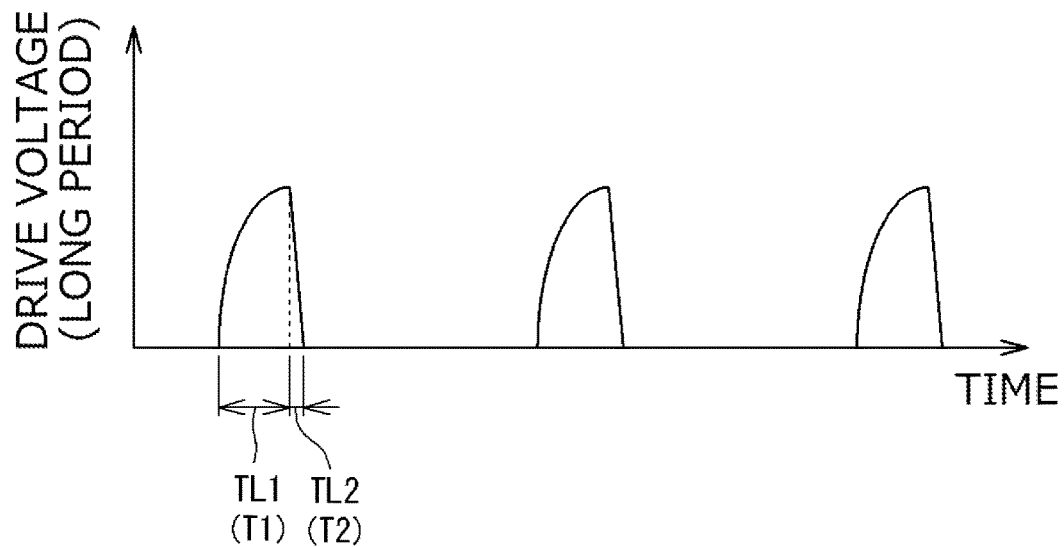
FIG. 4A indicates the voltage waveform of a drive voltage periodically applied to the piezo element at long periods.
Figure 4B:
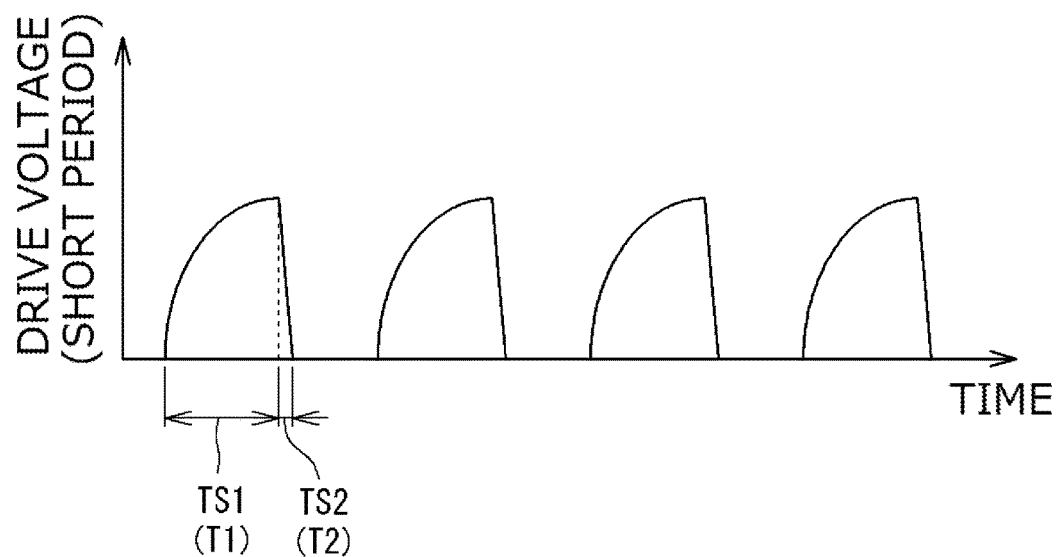
FIG. 4B indicates the voltage waveform of a drive voltage periodically applied to the piezo element at short periods.

FIG. 4 indicates voltage waveforms of a drive voltage periodically applied to the piezo element 43a according to the present embodiment. FIG. 4A indicates the voltage waveform of a drive voltage applied at long periods. FIG. 4B indicates the voltage waveform of a drive voltage applied at short periods. As illustrated in FIG. 4A, in the case where a drive voltage is applied to the piezo element 43a at long periods, the control portion 44 sets a rising time TL1 of a drive voltage to a short time. As illustrated in FIG. 4B, in the case where a drive voltage is applied to the piezo element 43a at short periods, in contrast, the control portion 44 sets a rising time TS1 of a drive voltage to a longer time than the rising time TL1 of the drive voltage for the case at long periods.

As illustrated in FIGS. 4A and 4B, in the case where a drive voltage is applied to the piezo element 43a at long periods and short periods, the control portion 44 performs control such that the voltage waveform during the rising times TL1 and TS1 is a waveform corresponding to a function other than a linear function. With the control portion 44 according to the present embodiment, the voltage waveform during the rising times TL1 and TS1 is formed as a convex curve. The voltage waveform during the rising times TL1 and TS1 is not limited to a convex curve, and may be a concave curve or waveform in different shapes corresponding to functions other than a linear function, or may be a waveform (linear waveform) corresponding to a linear function.

The control portion 44 performs control such that the falling time T2 of the drive voltage is constant irrespective of whether the drive period of the piezo element 43a is long or short. That is, as illustrated in FIGS. 4A and 4B, the control portion 44 sets a falling time TL2 of a drive voltage applied to the piezo element 43a at long intervals and a falling time TS2 of a drive voltage applied to the piezo element 43a at short intervals are set to the same time.

In the rolling bearing device 10 according to the present embodiment, as described above, the control portion 44 of the oil supply unit 40 changes the rising time of a drive voltage applied to the piezo element 43a in the pump 43 in accordance with whether or not the drive period of the piezo element 43a is long or short. Consequently, the time during which the capacity of the oil chamber 43b is varied is changed. Consequently, the time during which lubricating oil is suctioned into the oil chamber 43b can be changed. In the present embodiment, the rising time TS1 of a drive voltage for a case where the drive period of the piezo element 43a is short is longer than the rising time TL1 of a drive voltage for a case where the drive period of the piezo element 43a is long.

In this way, the time during which the capacity of the oil chamber 43b of the pump 43 is increased is made longer by making the rising time TS1 longer. Consequently, the time during which lubricating oil is suctioned into the oil chamber 43b can be made longer. As a result, lubricating oil can be suctioned into the oil chamber 43b sufficiently even if the piezo element 43a is driven at short drive periods in the case where lubricating oil with a high viscosity is discharged. As a result, operation of the pump 43 to discharge lubricating oil can be stabilized.

The control portion 44 controls operation of the pump 43 such that the falling times TL2 and TS2 of the drive voltage are constant irrespective of whether the drive period of the piezo element 43a is long or short. Consequently, the discharge velocity of lubricating oil (initial velocity of the oil droplets P) discharged from the pump 43 during the falling times TL2 and TS2 can be made constant irrespective of whether the drive period of the piezo element 43a is long or short. Consequently, operation of the pump 43 to discharge lubricating oil can be further stabilized.

The control portion 44 controls operation of the pump 43 such that the voltage waveform of the drive voltage during the rising times TL1 and TS1 is a waveform corresponding to a function other than a linear function. Therefore, operation of the pump can be controlled easily compared to a case where the pump is caused to operate such that the voltage waveform during the rising times TL1 and TS1 is a waveform corresponding to a linear function.

The embodiment disclosed above is exemplary in all respects, and not limiting. That is, the rolling bearing device and the oil supply unit according to the present invention are not limited to the illustrated embodiment, and may be in other embodiments without departing from the scope of the present invention. For example, in the embodiment described above, the bearing portion 20 is an angular contact ball bearing. However, the type of the bearing is not limited thereto, and may be a deep-groove ball bearing, or may be a tapered roller bearing or a cylindrical roller bearing.

The rolling bearing device 10 may be used for usage other than a main spindle of a machine tool. Further, the oil supply unit 40 may be used for usage other than lubrication of the bearing portion 20. For example, the oil supply unit 40 may be used for lubrication of a gear mechanism (rotary device) such as a speed reducer.

With the present invention, it is possible to stabilize operation of a pump to discharge lubricating oil even if the drive period of a piezo element is shortened.

What is claimed is:

1. A rolling bearing device comprising:
   a bearing portion that has an inner ring, an outer ring, a plurality of rolling elements interposed between the inner ring and the outer ring, and a cage that holds the plurality of rolling elements; and
   an oil supply unit provided adjacent to the bearing portion in an axial direction and configured to supply lubricating oil to the bearing portion, wherein
   the oil supply unit has:
      a pump that suctions lubricating oil into an oil chamber and discharges the lubricating oil by varying a capacity of the oil chamber by periodically driving a piezo element; and
      a control portion that causes the pump to operate by changing a rising time of a voltage applied to the piezo element in accordance with whether a drive period of the piezo element is long or short.

2. The rolling bearing device according to claim 1, wherein
   the control portion causes the pump to operate by making a falling time of the voltage constant irrespective of whether the drive period is long or short.

3. The rolling bearing device according to claim 2, wherein
   the control portion causes the pump to operate such that a voltage waveform during the rising time is a waveform corresponding to a function other than a linear function.

4. The rolling bearing device according to claim 1, wherein
   the control portion causes the pump to operate such that a voltage waveform during the rising time is a waveform corresponding to a function other than a linear function.

5. An oil supply unit provided in a rotary device and configured to supply lubricating oil to an oil supply region of the rotary device that requires oil supply, the oil supply unit comprising:
   a pump that suctions lubricating oil into an oil chamber and discharges the lubricating oil by varying a capacity of the oil chamber by periodically driving a piezo element; and
   a control portion that causes the pump to operate by changing a rising time of a voltage applied to the piezo element in accordance with whether a drive period of the piezo element is long or short.

* * * * *